United States Patent [19]
Bloomer

[11] Patent Number: 6,080,330
[45] Date of Patent: Jun. 27, 2000

[54] ANTI-FREEZING AND DEICING COMPOSITION AND METHOD

[76] Inventor: Todd A. Bloomer, 108 Parker Pl., Georgetown, Ky. 40324

[21] Appl. No.: 09/333,180

[22] Filed: Jun. 14, 1999

Related U.S. Application Data

[60] Provisional application No. 60/121,389, Feb. 24, 1999.

[51] Int. Cl.$^7$ ....................................................... C09K 3/18
[52] U.S. Cl. .................................................. 252/70; 106/13
[58] Field of Search .................................. 106/13; 252/70

[56] References Cited

U.S. PATENT DOCUMENTS

| | | | |
|---|---|---|---|
| 4,676,918 | 6/1987 | Toth et al. | 252/70 |
| 5,635,101 | 6/1997 | Janke et al. | 252/70 |
| 5,639,319 | 6/1997 | Daly | 152/450 |
| 5,709,812 | 1/1998 | Janke et al. | 252/70 |
| 5,709,813 | 1/1998 | Janke et al. | 252/70 |

OTHER PUBLICATIONS

Chemical Abstract No. 105:80842, abstract of Japanese Patent Specification No. 61–053382. (Mar. 1986).

*Primary Examiner*—Anthony Green
*Attorney, Agent, or Firm*—King and Schickli

[57] ABSTRACT

A composition is proposed for use in preventing the formation of ice or snow on outdoor surfaces, such as roadways or aggregate stockpiles, and also for deicing surfaces upon which snow or ice has formed. The composition is formed from a waste product of the process of removing sugar from sugar beet molasses, also known as desugared sugar beet molasses. As a byproduct of a widely used process for making edible sugar, the desugared sugar beet molasses is readily available at a low cost. Moreover, the composition is ready for use in conventional spraying equipment without the need for mixing agents, is environmentally friendly, and is able to perform at temperatures well below the freezing point of water. The composition is also non-corrosive and can be admixed with chloride salts, such as magnesium, calcium, or sodium chloride, to reduce the corrosiveness of the resulting solution while still providing effective deicing activity.

10 Claims, No Drawings

ANTI-FREEZING AND DEICING COMPOSITION AND METHOD

This application claims the benefit of provisional application Ser. No. 60/121,389, filed Feb. 24, 1999, entitled "Anti-freezing and Deicing Composition and Method.

TECHNICAL FIELD

The present invention relates generally to a composition and related method for preventing the accumulation of snow or ice on a surface or object and/or the deicing of surfaces or objects on which snow or ice has already accumulated.

BACKGROUND OF THE INVENTION

Many compounds are known as being helpful in removing snow and ice from surfaces, such as roadways or aggregate stockpiles of sand, gravel and coal, or to prevent ice and snow from forming on such surfaces. Of course, the compounds most prevalently used in the past were common types of chloride salts, such as calcium, magnesium, or sodium chloride. These compounds have long been accepted as the most efficient and cost effective manner of preventing the accumulation of snow and ice, or deicing surfaces upon which snow or ice has accumulated. However, there are several well-recognized limitations and detrimental effects resulting from the use of chloride salts.

One significant limitation is that chloride salts are effective as anti-freezing or deicing agents only at temperatures just below freezing, or to about 20° F. Of course, in the depths of winter, many climates in the United States frequently experience temperatures much lower than this for long periods of time. Such low temperatures will render such compounds ineffective and, thus, unsuitable for use as intended.

Additionally, the use of large amounts of chloride salts in snow or ice removal has long been recognized as being harmful to the environment. Of course, after spreading, the salts admix with the melting ice or snow. The runoff from this process can contaminate both above and below ground water supplies and harm plants or other materials that corrode or deteriorate when placed in contact with high concentrations of chloride salts.

An early proposal for overcoming these problems was made by Dr. Jeno Toth of Hungary. Legend has it that Dr. Toth observed that even at temperatures well below freezing, snow and ice did not form on outdoor surfaces near where commercial plants discharged waste products resulting from alcohol distillation processes. Thus, after experimentation, he proposed the use of these distillation byproducts as alternatives to chloride salts as anti-freezing and deicing agents. A description of his experimentation with these compounds is found in U.S. Pat. No. 4,676,918, issued Jun. 30, 1987.

Later proposals seeking to diversify from Dr. Toth's work propose the use of similar types of byproducts as anti-freezing or deicing agents. For example, U.S. Pat. Nos. 5,709,813, 5,709,812, and 5,635,101, all to Janke et al., propose the use of the waste byproducts of the wet corn milling, wine, and cheese-making processes as anti-freezing and deicing agents. While the compositions forming these byproducts serve as effective anti-freezing and deicing agents, several limitations remain.

First, many of the compositions proposed in these patents take on the consistency of "thick molasses" at low temperatures and at extremely low temperatures (e.g. below 0° F.), become thick and putty-like. In this form, the compounds can only be effectively spread onto surfaces for use if first placed in solution with water or other compounds, such as known prior art chemical deicing agents. While it is feasible to do so to form an improved anti-freezing/deicing solution, it has been observed that such a solution continues to be high in the concentration of suspended solids and, thus, tends to clog conventional spraying or spreading devices. Such clogging can result in poor or inadequate spreading over the surface/object to be treated and thus ineffective performance. Still further, significant downtime may be necessary to clean the sprayers used to apply the composition. This costly and labor intensive operation is often quite difficult when out on the job away from repair facilities and appropriate equipment for such a purpose. Further, it can be particularly detrimental when inclement weather, such as when snow storms or severe temperature drops accompanied by precipitation, are quickly approaching or ongoing.

Another difficulty is that the compositions resulting from the fermentation or cheese-making processes are often biologically reactive. Thus, if the right conditions are presented, the organisms responsible for fermentation will continue to "grow," even after application. For example, if a first layer of a fermentation byproduct containing yeast or other active cultures is applied to a roadway, and then a second application is made, air becomes entrained between these layers. With the right amount of light, heat, and moisture, the yeast will continue the fermentation process, which will yield strong odors and foam. Of course, in certain applications, such as where these compounds are used on roadways in residential neighborhoods, this unpleasant and unsightly mess my be tracked into garages and homes making these compositions totally unacceptable for use.

Finally, a frequent observation is that distillation and fermentation byproducts have an unpleasant odor. The odor is generally described as being similar to that associated with a feed lot on a farm. While this may be acceptable when such byproducts are used on rural highways or aggregate stockpiles in industrial settings, most urban residents are not accustomed to their streets smelling like fermenting silage and would not be willing to accept living with this odor as a trade-off for snow and ice-free roadways.

Thus, a need is identified for an improved anti-freezing and deicing composition that overcomes the above-described limitations of the prior art. The composition would preferably be readily available at a low cost, such as is the case with byproducts of widely used commercial processes, and would be ready for use in conventional devices such as sprayers without any additional mixing or processing. The composition would be non-corrosive and preferably would also inhibit corrosion when mixed with prior art chemical anti-freezing or deicing agents. Overall, the composition would be environmentally friendly and, thus, could be applied without harming plants or contaminating the ground or surface water.

SUMMARY OF THE INVENTION

Accordingly, it is a primary objective of the present invention to provide an anti-freezing and deicing composition that is readily available at a low cost, effective at temperatures well below freezing, suitable for use in conventional sprayers or like devices without modification or additional processing, non-corrosive, biologically inert, and non-offensively smelling.

An important objective of the present invention is to provide an anti-freezing and deicing composition that is readily soluble and miscible with water and other common chemical anti-freezing or deicing agents, such as chloride salts, while retaining the desired anti-freezing and deicing properties.

An additional objective of the present invention is to provide an anti-freezing and deicing composition that is effective when admixed with anti-skid agents for use on surfaces such as roadways in anticipation of inclement weather to prevent ice and snow formation and improve traction.

Still a further objective of the present invention is to provide an anti-freezing composition that may be applied on aggregate stockpiles in anticipation of low temperatures to keep the aggregate materials from freezing together.

Another important objective of the present invention is to provide an anti-freezing and deicing composition that provides residual effects for an extended period of time following an initial application, thereby preventing any significant amount of ice or snow pack from reforming on treated surfaces.

Yet another objective of the present invention is to provide an improved method of preventing ice and snow accumulation and/or deicing and cleaning surfaces of accumulated snow and ice in a more convenient, cost effective, reliable and efficient manner.

Additional objectives, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objectives, and in accordance with the purposes of the present invention as described herein, an improved anti-freezing and deicing composition is disclosed. As will be appreciated from reviewing the description which follows, the composition provides a readily available, low-cost, non-corrosive solution to the problem of both preventing the formation of and removing ice and snow from surfaces, such as roadways, and on other objects, such as aggregate stockpiles. Advantageously, the composition of the present invention overcomes the limitations of prior art proposals by working in conventional sprayers or spreading equipment without the need for either equipment modification or additional mixing or processing, without giving off an unpleasant odor, without being biologically reactive, and without harming the environment.

The anti-freezing and deicing composition of the present invention is a waste product of the process used to remove sugar from sugar beet molasses. Normally, this byproduct, which is commonly referred to as "desugared sugar beet molasses," is used as animal feed or simply discarded after all useful sugar is removed through processes well-known in the art and described below. However, it has been discovered that the desugared sugar beet molasses is highly effective as an anti-freezing and deicing agent that is suitable for use at temperatures well below the freezing point of water, while overcoming many of the disadvantages of prior art anti-freezing or deicing agents. For example, desugared sugar beet molasses is ready for use in conventional sprayers as delivered from the manufacturer without additional processing. Moreover, the desugared sugar beet molasses is less prone to biological upset, as it contains no alcohols, or other fermentation byproducts including yeasts and any other microorganisms associated with the fermentation process. Another advantage is that the solution has a non-offensive, light chocolate odor, that makes it acceptable for use in residential settings.

In accordance with another important feature of the proposed anti-freezing and deicing composition of the present invention, the desugared sugar beet molasses is readily soluble and miscible with other types of known chemical anti-freezing or deicing agents without affecting the basic properties thereof. Examples of such agents include sodium formate, calcium magnesium acetate, potassium acetate, ethylene glycol, di-ethylene glycol, or chloride salts, such as calcium chloride, magnesium chloride, or sodium chloride (preferably in the form of rock salt). As described further below, the desugared sugar beet molasses in solution improves the deicing properties of these prior art chemical deicers. As a result, lower concentrations of these chemical deicers are effective for their intended purpose. Consequently, the impact of these chemical deicers on the environment and any corrosive effects thereof are advantageously reduced.

It should be appreciated that the use of the term deicing connotes that the desugared sugar beet molasses is effective to remove ice and snow already accumulated on surfaces, such as concrete, pavement, aggregate stockpiles, or the like. However, it must also be appreciated that the desugared sugar beet molasses is also quite useful to prevent the formation or accumulation of snow or ice. For example, in anticipation of a storm or other type of inclement weather, the desugared sugar beet molasses can be applied to prevent snow or water from freezing on the roadways. Even if large amounts of snow or ice are deposited on the road, the composition prevents the ice from sheeting or the snow from becoming packed down, which advantageously allows road crews to remove the accumulation in an expeditious manner. A residual effect is also observed, such that surfaces where the composition is applied tend to prevent the formation of solid ice or snow pack thereon for an extended period of time following an initial application.

When using the composition of the present invention on roadways, it is also possible to admix the desugared sugar beet solution with anti-skid materials such as sand or cinders to improve traction. Of course, this can be done both when applying the solution in anticipation of a snow or ice accumulation or when the solution is used to remove ice or snow that has already accumulated on roadway surfaces or the like.

In accordance with another important aspect of the invention, the desugared sugar beet molasses composition is non-corrosive and environmentally friendly. Thus, it will not harm vehicles or other outdoor structures fabricated from typically corrosion prone metals, nor will it promote spalling or other damage to concrete or pavement. Through experimentation, it was discovered that when the desugared sugar beet molasses is mixed with typically corrosive anti-freezing and deicing compounds, such as chloride salts, the beet molasses of the present invention actually serves to reduce or eliminate the corrosiveness of the solution.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention.

DETAILED DESCRIPTION OF THE INVENTION

The anti-freezing and deicing composition of the present invention is formed using a waste product of the process for removing sugar from sugar beet molasses, also known as desugared sugar beet molasses. As is well-known in the art, sugar beets are used to produce commercial grade sugar that serves as a substitute for the often more expensive cane sugar. The older of two most widely used processes of removing sugar from sugar beets involves cleaning the beets and slicing them into thin chips. The sliced beets are then subjected to a sugar extraction process whereby hot water is passed over the beets for approximately one hour. This process removes most, but not all, of the sugar from the beets in the form of beet "juice." The beets are then pressed in screw presses to remove the remaining sugar containing juice therefrom. The juice is then subjected to a process called carbonation, where small clumps of chalk are provided in the juice to filter out any non-sugars. The chalk is then filtered from the juice, which is evaporated to form a syrup. The syrup is then boiled until sugar crystals form therein. Once the crystals form, the resulting mixture is centrifuged to separate the crystals from the remaining liquor. The crystals become commercial grade sugar; the liquor is the desugared sugar beet molasses that forms the anti-freezing and deicing composition of the present invention.

A second, more modern process for obtaining desugared sugar beet molasses, known as the Steffen process, is described in U.S. Pat. No. 5,639,319 to Daly, which proposes the use of desugared sugar beet molasses as a tire ballast. The disclosure of this patent as it relates to the production of desugared sugar beet molasses and the properties and various suppliers thereof is incorporated herein by reference. It should be appreciated that the manner of producing the desugared sugar beet molasses is not critical to the present invention, although it is observed that sugar beet molasses which is a byproduct of the Steffen process generally exhibits slightly better anti-freezing and deicing properties relative to the desugared sugar beet molasses formed using other conventional methods. However, it should be realized that both will generally serve equally well for purposes of the composition of the present invention.

Experimentation revealed that the resultant desugared sugar beet molasses from the desugaring process is an excellent anti-freezing and deicing composition that provides several benefits over known compositions previously proposed for this purpose. The desugared sugar beet molasses is approximately 60–75% suspended solids. Thus, it can be pumped or sprayed using existing equipment without mixture with additional water or other thinners. Additionally, the desugared sugar beet molasses has a low freezing point and is flowable at low temperatures (approximately 150 cps at −30° F.). Of course, this means that it can be sprayed for application at temperatures well below freezing. Thus, the present invention is particularly useful in cold climate areas where the temperature is too low for brine solutions to effectively provide deicing. The molasses is also environmentally friendly, is not biologically reactive, and is both non-corrosive and a corrosion inhibitor.

Another advantage of the proposed composition is that it can be mixed with commercially available chemical anti-freezing or deicing agents without inhibiting the beneficial properties thereof. In the preferred embodiment, as described further below, the composition of the present invention includes from 25–99% by volume desugared sugar beet molasses and 1–75% by volume of a deicer component selected from a group consisting of sodium formate, calcium magnesium acetate, ethylene glycol, di-ethylene glycol, chloride salts (eg. magnesium chloride, calcium chloride, sodium chloride, potassium chloride) and mixtures thereof. Still, more preferably, the composition comprises about 30–70% by volume desugared sugar beet molasses and 10–70% by volume of the deicer component. While higher concentrations are possible, generally the maximum percent by weight of the deicing agents used are: sodium formate 55%, calcium magnesium acetate 50%, potassium acetate 50%, ethylene glycol 70%, di-ethylene glycol 70%, sodium chloride 35%, calcium chloride 45%, magnesium chloride 40% and potassium chloride 42%. In a particularly useful embodiment the composition comprises about 50% by volume (of a 60–65% solids by weight) desugared sugar beet molasses, about 40% by volume of a 30% solution by weight magnesium chloride and about 10% by volume added water. This solution was found in experiments to have superior flow characteristics at very low temperatures, while retaining the desirable anti-freezing and deicing characteristics of the desugared sugar beet molasses.

Another useful embodiment of the present invention is a composition comprising between substantially 60–75% of solids by weight desugared sugar beet molasses added at 8–10 gallons per ton of rock salt. Of course, water may be added to all embodiments as desired or as necessary to improve spraying performance.

Still a further advantage is that anti-skid agents can be mixed with the molasses to improve roadway traction. Examples of such anti-skid materials include sand, gravel, cinders, limestone aggregate, fly ash, river rock or the like and mixtures thereof It is contemplated that the application of such a mixture may occur prior to the inclement weather, which allows the solution to not only assist in preventing roadway freeze-overs, but also to improve roadway traction. However, it is of course within the broadest aspects of the invention for the composition of the present invention to be applied to existing patches of snow or ice to act as a deicing agent.

The following detailed examples illustrate experiments which demonstrate the improved properties and characteristics of the compositions of the present invention. Of course, these examples are provided for purposes of illustration only and are not intended to be limiting.

EXAMPLE 1

The initial objective was to determine if a solution of 70% by volume of a 60–65% solids by weight desugared sugar beets and 30% by volume of a 30% solution by weight magnesium chloride would act as a suitable deicing agent at a temperature of 2° F. on approximately 1" of snow and ice formed on a concrete sidewalk and patio. One ounce of the solution was applied per square yard using conventional sprayers. After one hour, it was observed that the solution had melted through the snow and ice completely. It was also observed that the application area doubled within fifteen minutes of application and that after the solution melted the snow and ice down to the concrete surface, it continued to move in other directions under the snow and ice layer, thereby propagating the deicing effects. No discoloring of the concrete was observed.

EXAMPLE 2

Approximately one day later, the same location treated during the experiment described in Example 1 was revisited.

The temperature in the intervening period had ranged from between 8–22° F. A residual effect was observed, in that although blowing snow and ice had accumulated on top of some treated areas, the mixture prevented the snow and ice from sheeting or completely freezing. Thus, the snow and ice accumulated was easily removed from the surface by light scraping, such as using a foot, shovel, or similar object, to reveal clean pavement underneath. Again, no damage or permanent markings on the concrete were observed.

EXAMPLE 3

Two test sites were created on snow-covered concrete using (1) a pure desugared sugar beet solution containing 65% solids; and (2) a 70% by volume of 60–65% solids by weight desugared sugar beet solution mixed with 30% by volume of 30% solids by weight solution of magnesium chloride. The application rate was 1–2 ounces per square yard for both solutions on top of ¾–1" of snow. Over the course of three hours, wherein the temperature ranged from 8–22° F., both products melted the snow. It was observed that the concrete surface has a slight slope to it, and as the mixture melted the snow, it ran down the slope and continued the melting process. It also moved uphill slightly in a circular pattern as it continued to melt the snow.

EXAMPLE 4

On concrete pavement at an ambient temperature of between 16 and 24° F., four different solutions were applied to an accumulation of between ¼–1" of ice and snow. After twenty minutes, the results were as follows:

| Application Rate | Composition | Observations |
|---|---|---|
| 1–2 oz./ sq. yd. | Desugared sugar beet molasses alone 60–65% solids | Performed very well; melted snow and ice and continued to move laterally; moved underneath surface of snow. |
| 1–2 oz./ sq. yd. | 70% desugared sugar beet molasses (60–65% solids by weight) mixed with 30% magnesium chloride (30% solids by weight) | Very good results; Improved flow and melted more from the top of the ice downward to underneath the surface. |
| 3 oz./5 lbs (8 gal./ ton) | Desugared sugar beet molasses (60–65% solids by weight) mixed with rock salt | Very good results; spread at a fast rate. |
| 1–2 oz./ sq. yd. | 40% desugared sugar beet molasses (60–65% solids by weight) mixed with 50% of a 30% solids by weight magnesium chloride and 10% water by volume | Excellent results; no solids formed in solution, which avoided clogging the spray nozzles. |

It should also be noted that for several hours prior to application, the above solutions were maintained at the ambient temperature, yet no flow problems were observed using conventional sprayers.

EXAMPLE 6

The corrosiveness of the desugared sugar beet solution was tested by dipping a mild steel nail in the solution for three months. No corrosion on the nail was observed.

EXAMPLE 7

The corrosion inhibition of the desugared sugar beet solution was tested by placing mild steel nails in solutions formed of both 30% by volume of 60–65% solids by weight desugared sugar beet solution/70% by volume of a 30% solids by weight magnesium chloride and 30% by volume of a 65% solids by weight desugared sugar beet solution/70% by volume of a 32% solids by weight calcium chloride. No corrosion was observed at the end of three months.

The typical composition of the desugared sugar beet solution of the present invention is as follows:

EXAMPLE 8

3 ounces of desugared sugar beet molasses having between 60–65% suspended solid are mixed in a mixing vessel with 5 lbs of sodium chloride and spread over a surface to remove snow and ice by melting which equates to 8 gallons per ton of rock salt.

EXAMPLE 9

Sodium formate, calcium magnesium acetate, potassium acetate, ethylene glycol, di-ethylene glycol, magnesium chloride, calcium chloride, potassium chloride and any mixtures thereof are substituted for the sodium chloride in example 8.

The typical composition of the desugared sugar beet molasses of the present invention is as follows (all measurements are approximate):

| Item | Content |
|---|---|
| Moisture | 40% |
| Fructose Polymers | 15% |
| Amino Acid Protein Polymers | 12% |
| Other Carbohydrates, Starches, and Polymers | 17% |
| Potassium | 9% |
| Sodium | 3% |
| Chlorine | 1% |
| Other Ash/Calcium Oxide | 3% |

Other physical characteristics include:

| | |
|---|---|
| • Weight | 10.7 pounds/gallon |
| • PH | 9–10 |
| • Freezing Point | <–30° F. |
| • Boiling Point | 212° F. |
| • Viscosity | 150 cps at –30° F. |
| • Color | darkbrown |
| • Odor | chocolate |

The foregoing description of the anti-freezing and deicing composition of the present invention has been presented for purposes of illustration and description. It is not intended to be exhaustive or to limit the invention to the precise form disclosed. Obvious modifications or variations are possible in light of the above teachings. For example, the desugared sugar beet molasses doesn't need to be mixed with the deicer component or anti-skid agent prior to application to the surface being treated. The desugared sugar beet molasses may be applied to the surface separately either before or after treatment of that surface with a deicer and/or anti-skid agent of a type known in the art. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A composition for deicing and inhibiting the formation of ice and snow on surfaces comprising from 25–99% by volume of desugared sugar beet molasses having 60–75% suspended solids and 1–75% by volume of a component selected from the group consisting of sodium formate, calcium magnesium acetate, potassium acetate, ethylene glycol, di-ethylene glycol, magnesium chloride, calcium chloride, sodium chloride, potassium chloride and mixtures thereof.

2. The composition of claim 1, further including water as a carrier for purposes of spray application.

3. The composition of claim 1, wherein said chloride salts form between 10–70% by volume of said mixture.

4. The composition according to claim 1, wherein said desugared sugar beet molasses includes fructose polymers, amino acid protein polymers, carbohydrates, starches and water and has a viscosity of substantially 150 cps at −30° F.

5. A composition for deicing or inhibiting the formation of ice and snow on surfaces comprising a mixture of from 40–60% by volume of a 60–65% solids by weight desugared sugar beet molasses, from 35–45% by volume of a 30% solution by weight of magnesium chloride, and from 1–20% by volume of water.

6. A composition for deicing or inhibiting the formation of ice and snow on surfaces comprising a mixture of desugared sugar beet molasses and rock salt including from 8–10 gallons of desugared sugar beet molasses per ton of rock salt.

7. A method of preventing the accumulation of ice or snow on a surface, comprising the step of spreading a composition including 25–99% desugared sugar beet molasses and 1–75% by volume of a component selected from a group consisting of sodium formate, calcium magnesium acetate, potassium acetate, ethylene glycol, di-ethylene glycol, magnesium chloride, calcium chloride, sodium chloride, potassium chloride and mixtures thereof on said surface.

8. A method of removing ice or snow formed on a surface comprising the step of spreading a composition containing 25–99% desugared sugar beet molasses, 1–75% by volume of a component selected from the group consisting of sodium formate, calcium magnesium acetate, potassium acetate, ethylene glycol, di-ethylene glycol, magnesium chloride, calcium chloride, sodium chloride, potassium chloride and mixtures thereof and an anti-skid agent selected from a group consisting of sand, gravel, cinders, limestone aggregate, fly ash, river rock and mixtures thereof on said ice and snow ice and snow formed on said surface.

9. A method of creating a composition and using said composition for deicing or preventing the formation of ice and snow on surfaces, objects, or the like, comprising:

removing the sugar from sugar beet molasses;

mixing the byproduct resulting from the removal of sugar from sugar beet molasses with water and a chloride salt selected from a group consisting of calcium chloride, sodium chloride, potassium chloride, magnesium chloride and mixtures thereof to obtain a solution;

spreading said solution on said surfaces or objects in an effective amount to remove ice or snow formed thereon or to prevent the accumulation of ice or snow thereon.

10. A composition for deicing and inhibiting the formation of ice and snow on surfaces comprising from 25–99% by volume of desugared sugar beet molasses, 1–75% by volume of a component selected from a group consisting of sodium formate, calcium magnesium acetate, potassium acetate, ethylene glycol, di-ethylene glycol, magnesium chloride, calcium chloride, sodium chloride, potassium chloride and mixtures thereof and an anti-skid agent selected from a group consisting of sand, gravel, cinders, limestone aggregate, fly ash, river rock and thereof.

* * * * *

UNITED STATES PATENT AND TRADEMARK OFFICE
CERTIFICATE OF CORRECTION

PATENT NO : 6,080,330
DATED : June 27, 2000
INVENTOR(S) : Todd A. Bloomer

It is certified that error appears in the above-identified patent and that said Letters Patent are hereby corrected as shown below:

Column 9, Claim 8, line 14, delete "ice and snow".
Column 10, Claim 10, line 37 after the word "and" insert - - mixtures - -.

Signed and Sealed this

Twenty-fourth Day of April, 2001

NICHOLAS P. GODICI

Attest:

Attesting Officer

Acting Director of the United States Patent and Trademark Office